United States Patent [19]
Boger

[11] Patent Number: 5,890,505
[45] Date of Patent: Apr. 6, 1999

[54] LOW NOISE BALL VALVE ASSEMBLY WITH DOWNSTREAM AIRFOIL INSERT

[75] Inventor: Henry William Boger, Foxboro, Mass.

[73] Assignee: Dresser Industries, Inc., Dallas, Tex.

[21] Appl. No.: 819,760

[22] Filed: Apr. 3, 1997

[51] Int. Cl.⁶ .................................................. E03B 1/00
[52] U.S. Cl. ...................... 137/1; 137/625.32; 251/127; 138/41; 138/40
[58] Field of Search .................................. 137/1, 625.32, 137/625.31; 251/127, 118; 138/46, 40, 42, 44

[56] References Cited

U.S. PATENT DOCUMENTS

| | | | |
|---|---|---|---|
| 1,144,306 | 6/1915 | Mock ........................................ | 251/127 |
| 3,665,965 | 5/1972 | Baumann ................................. | 251/127 |
| 4,007,908 | 2/1977 | Smagghe et al. ........................ | 138/40 |
| 4,212,321 | 7/1980 | Hulsey . | |
| 4,295,493 | 10/1981 | Bey ........................................... | 138/46 |
| 4,364,415 | 12/1982 | Polon . | |
| 4,479,510 | 10/1984 | Bey . | |
| 4,530,375 | 7/1985 | Bey . | |
| 4,540,025 | 9/1985 | Ledeen et al. . | |
| 4,610,273 | 9/1986 | Bey . | |
| 4,691,894 | 9/1987 | Pyotsia et al. ........................... | 251/127 |
| 5,070,909 | 12/1991 | Davenport ........................... | 137/625.32 |
| 5,180,139 | 1/1993 | Gethmann et al. . | |
| 5,218,984 | 6/1993 | Allen . | |
| 5,287,889 | 2/1994 | Leinen . | |
| 5,332,004 | 7/1994 | Gethmann et al. . | |
| 5,400,825 | 3/1995 | Gethmann et al. . | |
| 5,495,872 | 3/1996 | Gallagher et al. ........................ | 138/40 |

FOREIGN PATENT DOCUMENTS

| | | | |
|---|---|---|---|
| 101323 | 2/1984 | European Pat. Off. . | |
| 0325846 | 11/1988 | European Pat. Off. . | |
| 1200688 | 9/1965 | Germany . | |
| 2352370 | 4/1975 | Germany . | |
| 2402774 | 7/1975 | Germany ............................... | 251/118 |
| 237241 | 8/1945 | Switzerland . | |
| 520083 | 4/1940 | United Kingdom ..................... | 138/40 |

OTHER PUBLICATIONS

Series 61 and 62, High Performance Rotary Valves, INTROL, Kent Process Control, Inc., Sep. 1987.
Neles Control Valves for Gas Transmission and Distribution, Mar. 1989.
Reglerventilen Som Löser Problem Med Kavitation Och Reducerar Ljud, NAF–Trimball, NAF, Sep. 1988, NAF Enertech Group.

*Primary Examiner*—Denise L. Ferensic
*Assistant Examiner*—John Ball
*Attorney, Agent, or Firm*—Haynes and Boone, L.L.P.

[57] ABSTRACT

A valve assembly and method for controlling the flow of fluid through a conduit in which a ball valve is disposed in the conduit and is provided with a through bore for receiving the fluid. An insert is also disposed in the conduit downstream of the ball valve and has a plurality of relatively small flow passages. A relatively large flow passage is defined by that portion of the conduit not occupied by the insert. The valve is rotatable in the conduit to direct the fluid from its bore through one or more of the flow passages and a portion of the insert forms an airfoil surface to prevent separation of the fluid as it passes through the relatively large flow passage.

13 Claims, 2 Drawing Sheets

LOW NOISE BALL VALVE ASSEMBLY WITH DOWNSTREAM AIRFOIL INSERT

BACKGROUND OF THE INVENTION

The present invention relates to a low noise ball valve assembly and, more particularly, to such an assembly for controlling the transmission and distribution of a fluid.

In the transmission and distribution of compressible fluids, such as natural gas, there are requirements for valves that control a variable, such as pressure or flow rate, and operate at high pressure drops, that is, high pressure differentials between the upstream and downstream pressure. As such, these valves are fitted with actuators and positioners that respond to a control signal generated by a controller or computer.

When a compressible fluid is throttled through a control valve at a high pressure drop, no is generated in the fluid aerodynamically, and subsequently is propagated through the fluid, exciting the pipe walls (principally downstream), thereby causing noise to be propagated to the surrounding atmosphere. The result may be noise that exceeds allowable limits for worker hearing conservation.

A second concern involved with the throttling of a compressible fluid through a control valve is that it often causes excessive mechanical vibration results in attendant problems with the proper operation of associated measuring and controlling equipment. In addition, the vibration can also cause fatigue failure of welds or piping.

Ball valves are frequently used for shutoff valves and for control valves for special applications, such as the transmission and distribution of natural gas. In order to reduce noise and mechanical vibration when ball valves are used, inserts have been placed in the ball valves which are provided with a plurality of relatively small-diameter passages through which the fluid passes under certain flow conditions. However, the availability of inserts for ball valves that offer significant reduction of noise and mechanical vibration have been very limited.

Also, ball valves of the above type are often limited to applications in which there is a high pressure drop throughout the entire range of travel of the valve. In these cases, the valves are designed for the continuous reduction of noise and mechanical vibration over their entire range of travel. However, there are applications that involve a relatively high pressure drop at relatively low flow rates and small valve openings, and a relatively low pressure drop at maximum flow and relatively large valve openings. In the latter, low pressure-drop situation, a flow capacity is required that is higher than would be possible utilizing a valve designed for continuous noise reduction based on a high pressure drop throughout the entire valve travel range.

Also, ball valves that have inserts of the above type that are welded, or otherwise attached, within a spherical ball, are difficult to manufacture and often cause distortion of the ball valve. Further, ball valves having inserts of the above type can cause separation of the gas flow as it passes through the valve which results in losses in a pressure drop which compromises the performance of the valve.

Therefore what is needed is a ball valve that can reduce noise at relatively low flow rates and small valve openings at relatively high pressure drops, yet can respond to relatively low pressure drop situations and achieve maximum flow. Also needed is a ball valve of the above type that reduces mechanical vibration, is relative easy to manufacture, and is not easily subjected to distortion.

Further, a ball valve of the above type is needed that eliminates flow separation of the gas as it passes through the valve.

SUMMARY OF THE INVENTION

The present invention, accordingly, provides a ball valve assembly for controlling the flow of fluid through a conduit in which a ball valve is disposed in the conduit and is provided with a through bore for receiving the fluid. An insert is also disposed in the conduit downstream of the ball valve and defines a plurality of relatively small flow passages and a relatively large flow passage. The valve is rotatable in the conduit to direct the fluid from its bore through one or more of the flow passages, and a portion of the insert forms an airfoil surface to prevent separation of the fluid as it passes through the relatively large flow passage. A cavity is provided between some of the small flow passages to permit two-stage pressure reduction and therefore increased noise reduction.

Major advantages are achieved with the ball valve assembly of the present invention since noise and mechanical vibrations generated by the flow of the fluid is significantly reduced at relatively small valve openings and low flow rates, while maximum flow can be achieved when the pressure drop is relatively low. Also, the ball valve assembly of the present invention is relatively easy to manufacture, reduces distortion of the ball valve, and includes an airfoil surface that eliminates separation of the fluid.

DESCRIPTION OF THE PREFERRED EMBODIMENT

Figure 1:
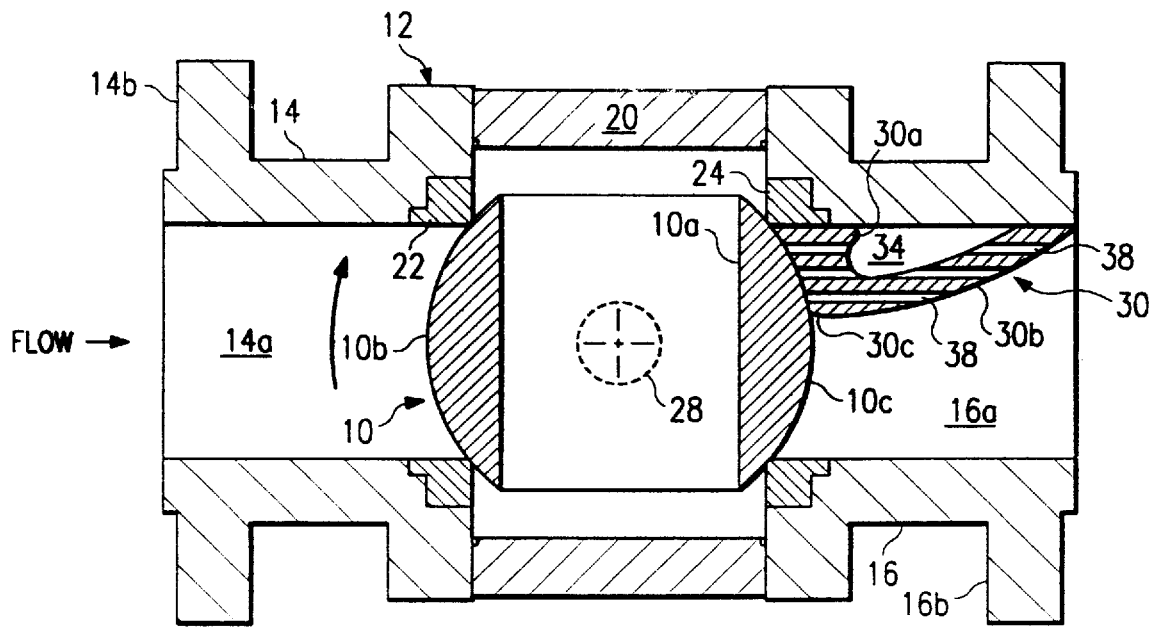
FIGS. 1, 3 and 4 are cross-sectional views depicting the ball valve assembly of the present invention in three operating modes.

FIG. 1 of the drawings depicts an embodiment of the ball valve assembly of the present invention which includes a ball valve 10 disposed in a valve body 12 formed by a cylindrical inlet section 14. An inlet bore 14a extends through the inlet section 14 and a circular flange 14b is provided on the outer wall in the inlet section for connection to a inlet pipe (not shown) for supplying a compressible fluid, such as natural gas, to the inlet section. A cylindrical outlet section 16 is also provided which has an outlet bore 16a and a circular flange 16b formed on its outer wall for connection to an outlet pipe (not shown) for receiving the fluid from the outlet section.

An outer support ring 20 extends between the sections 14 and 16, with the inner surface of the ring in a spaced relation to the outer surface of the ball valve 10. The support ring 20 is connected between the sections 14 and 16 in any known manner, such as by bolts, or the like (not shown).

A pair of axially-spaced seal assemblies 22 and 24 are mounted in circular notches or grooves, provided in the inner end portions of the inlet section 14 and the outlet section 16, respectively. The support ring 20 and the seal assemblies 22 and 24 will not be described in any further detail since they do not form any part of the present invention.

The valve 10 is in the form of a ball, or sphere, having a central through bore 10a. Thus, two solid portions 10b and 10c, each having a convex outer surface, are defined. In the closed position of the valve 10 shown in FIG. 1, the solid portion 10b blocks the flow of fluid from the inlet section 14 to the outlet section 16.

A pair of stems, one of which is shown in phantom lines and referred to by the reference numeral 28, are connected to the outer surface of the ball valve 10 at diametrically opposite portions thereof to enable the ball valve to be rotated in a manner to be described. The stems 28 are connected to conventional ancillary equipment (not shown) that rotate the stems, and therefore the ball valve 10, about an axis coinciding with the axes of the stems, with the seals 22 and 24 functioning to provide a fluid seal, all in a conventional manner.

Figure 2:
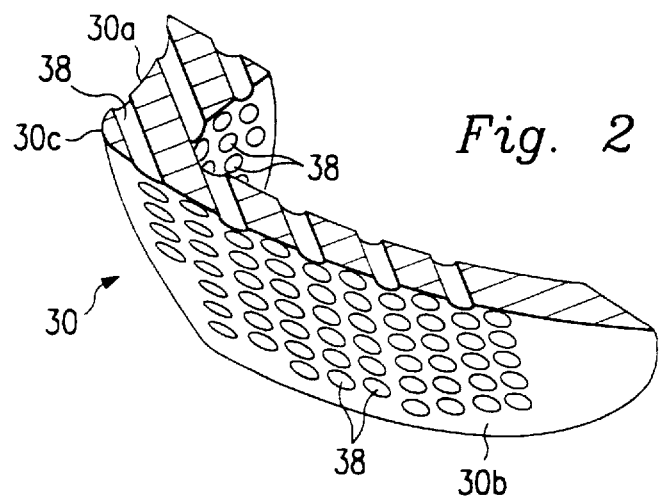
FIG. 2 is an isometric view of the insert of the ball valve assembly of FIGS. 1, 3, and 4.

According to a feature of the present invention, an insert 30 is provided in the outlet bore 16a of the outlet section 16 just downstream of the ball valve 10, and is designed to reduce the noise and mechanical vibrations generated as a result of the flow of fluid through the ball valve. As shown in FIGS. 1 and 2, the insert 30 is in the form of a plate-like member having a relatively short leg portion 30a, a relatively long leg portion 30b and an enlarged-width elbow portion 30c connecting the leg portions 30a and 30b. The leg portion 30a extends from the elbow portion 30c substantially perpendicular to the axis of the bore 10a, and the leg portion 30b extends from the elbow 30c, curves back to the trailing, or outlet, end of the outlet bore 16a, and is shaped so to form a smooth, curved "airfoil" design. The respective distal ends of the leg portions 30a and 30b rest against corresponding inner surface portions of that portion of the outlet section 16 defining the outlet bore 16a to define an enclosed cavity 34. The outer surface of the leg portion 30a is concave, with its curvature corresponding to the convex outer surface of the portion 10c of the ball valve 10.

A series of spaced, parallel rows of flow passages 38 are formed through the insert 30 with the passages 38 each row (FIG. 2) extending in a spaced, parallel relationship. The passages 38 receive the fluid from the ball valve 10 under conditions to be described, and the diameter of each passage 38 is significantly less than the diameter of the conduit 16a. As a result, the passages function to significantly reduce the noise level that would otherwise be generated by the flow of the fluid through the assembly in accordance with well-established theories as explained above.

The passages 38 extending through the leg portion 30a of the insert 30 extend from the ball valve 10 to the cavity 34, and the passages extending through the leg portion 30c extend from the cavity 34 to the outlet bore 16a. This permits two-stage pressure reduction and an increase in noise reduction, as will be described. The passages 38 in the bottom row, as viewed in FIG. 1, extend from the ball valve 10 directly to the outlet bore 16a. The insert 30 occupies a portion of the cross-section of the outlet bore 16a with the remaining portion of the latter bore forming a relatively large-diameter flow passage for the fluid, under conditions to be described.

When the ball valve 10 is in its closed position shown in FIG. 1, the concave outer surface of the leg portion 30a receives a corresponding portion of the convex valve portion 10c. In this closed position, the solid portion 10b blocks the flow of fluid from the inlet bore 14a through the valve 10.

Figure 3:
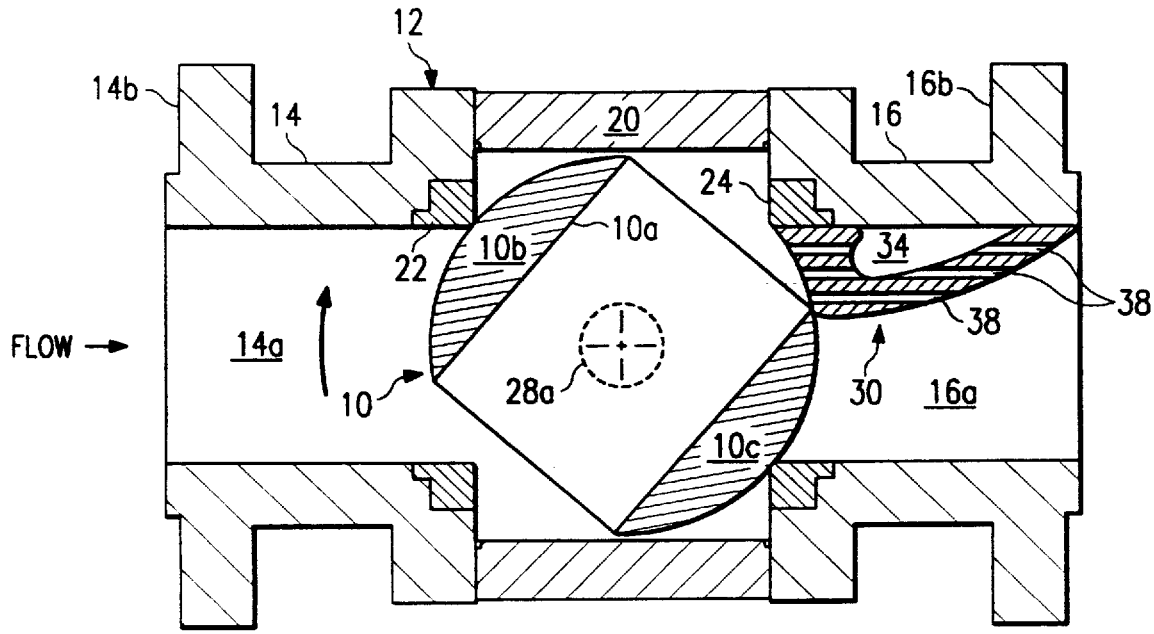

In the event fluid flow is desired, the valve 10 is rotated by rotating the valve stems 28 in a clockwise direction as shown by the arrow in FIG. 1 until the inlet end of the bore 10a is exposed to the bore 14a as shown, for example, in FIG. 3. This movement also exposes one or more of the passages 38 of the insert 30 to the outlet end of the bore 10a, with the number of exposed passages depending on the degree of rotation of the ball valve 10. Assuming that the valve 10 is moved to the position of FIG. 3 in which all of the passages 38 are exposed and the outlet bore 16a is otherwise blocked, the fluid flows from the inlet bore 14a, into and through the exposed bore 10a of the ball valve 10, and into the exposed passages 38. That portion of the fluid passing through the passages 38 in the leg portion 30a of the insert 30 enters the cavity 34, and passes from the cavity, through the passages 38 in the leg portion 30b, and to the outlet bore 16a. This achieves two-stage pressure reduction and increased noise reduction in accordance with well-known principles. The remaining portion of the fluid passes through the lower row of passages directly to the outlet bore 16a. The fluid exits the outlet bore 16a and passes into the above-mentioned outlet pipe attached to the outlet section 16.

Figure 4:
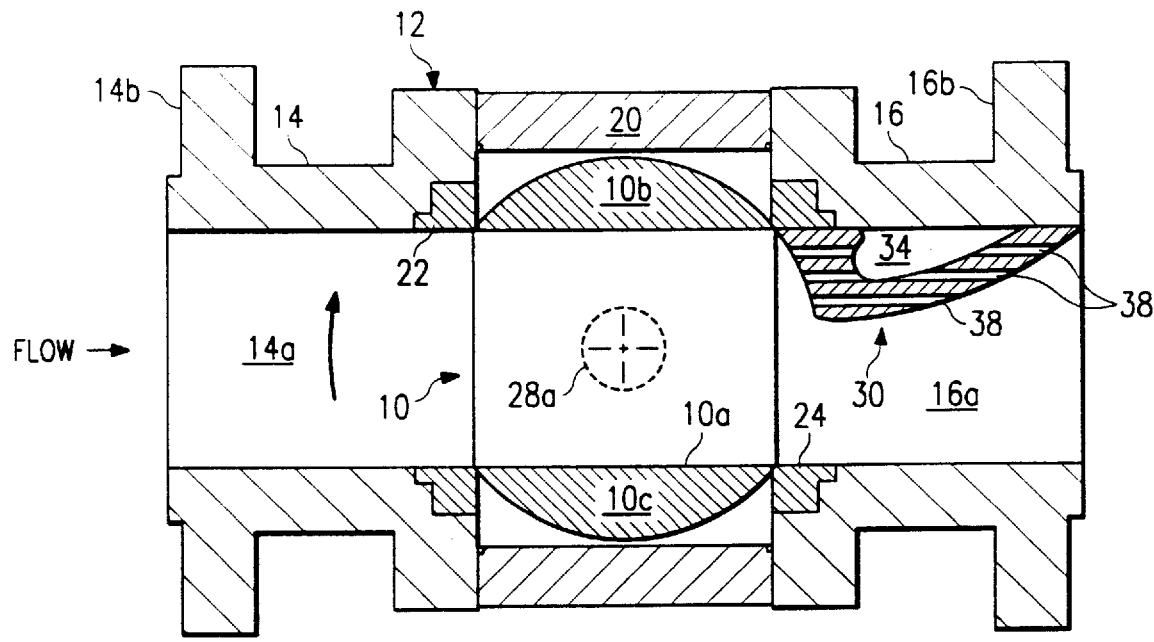

In the event fall flow is desired, the ball valve 10 is rotated further in the clock-wise direction until it reaches the fully opened position shown in FIG. 4. In this position, all of the passages 38 in the insert 30, as well as the portion of the outlet bore 16a not occupied by the insert, are exposed to the fluid in the inlet bore 14a and the bore 10a of the ball valve 10. Since the latter portion of the outlet bore 16a is much larger in cross-section than the cross-section of each passage 38, it defines a flow passage that provides the least resistance to fluid flow. Therefore, a great majority of the fluid flows from the inlet bore 14a, through the bore 10a of the ball valve 10, and though the outlet bore 16a into the above-mentioned outlet pipe. During this flow, the fluid attaches to the outer surface of the leg portion 30b of the insert 30 due to the smooth airfoil design of the latter leg portion, while a minor portion of the fluid flows through the passages 38 of the insert.

It is understood that the position of the ball valve 10 depicted in FIG. 3 is only for the purpose of example and that the valve can take any intermediate position between the closed position of FIG. 1 and the fully opened position of FIG. 4 depending on the particular fluid flow desired.

Thus, according to the present invention, the ball valve assembly and method of the present invention achieves two-stage pressure reduction and when the valve ball 10 is partially opened, as shown by way of example in FIG. 3, which increases the noise reduction when compared to single stage reduction and which produces a substantially attenuated high peak frequency. Also, in the fully opened position of FIG. 4, relatively high flow capacity is achieved (with reduced noise reduction) since a great majority of the fluid flow bypasses the insert 30 as it flows from the bore 10a to the outlet bore 16a. The assembly of the present invention is thus especially suited for applications in which a relatively high pressure drop occurs at relatively low opening of the ball valve 10, and the pressure drop lowers to a relatively low value as the valve opening increases. Thus, the assembly of the present invention is operable over a relatively wide range of pressure drops and flow rates.

Also, the mechanical vibrations generated by the flow of the fluid is significantly reduced at relatively small valve openings and low flow rates. Further, as a result of the inset 30 being located downstream of the ball valve 10, the assembly of the present invention is relatively easy to manufacture and minimizes distortion of the ball valve. Still further, due to the smooth "airfoil" design of the leg portion 30b of the insert 30, the fluid attaches to the outer surface of the latter leg portion as it passes through the outlet bore 16a, thus permitting significant pressure recovery.

It is understood that variations may be made in the foregoing without departing from the scope of the invention. For example, the present invention is not limited to the specific number and arrangement of the passages 38 in the insert 30. For example, the passages 38 in the leg portion 30b can have larger diameters than the diameters of the passages in the leg portion 30a (and/or 30c). Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A valve assembly for controlling the flow of fluid through a conduit, the valve assembly comprising a ball valve disposed in the conduit and having a through bore formed therein for receiving the fluid; and an insert disposed in the conduit downstream of the ball valve and defining a plurality of small flow passages and at least one large flow passage, the valve being rotatable in the conduit to direct the fluid from its bore through one or more of the flow passages, a portion of the insert forming an airfoil surface to prevent separation of the fluid as it passes through the relatively large flow passage.

2. The assembly of claim 1 wherein the valve directs the fluid through one or more of the relatively small flow passages or through the small flow passages and the large flow passage.

3. The assembly of claim 1 wherein the flow of fluid through the relatively small flow passages reduces the flow rate and the noise generated by the fluid flow, and the flow of fluid through the relatively large-diameter passage increases the flow rate.

4. The valve assembly of claim 1 where the relatively small flow passages are formed through the insert; and wherein the insert, and that portion of the conduit not occupied by the insert, forms the relatively large flow passage.

5. The assembly of claim 4 wherein the insert defines with the corresponding surface defining the conduit, a cavity, so that a portion of fluid flows from some of the passages in the insert, into the cavity, and through other passages in the insert to achieve two-stage pressure reduction.

6. The assembly of claim 1 wherein, upon rotation of the ball valve from its open position to its closed position, the valve directs the fluid through the relatively small flow passages before the relatively large flow passage.

7. The assembly of claim 1 wherein, in the fully open position of the valve, the fluid flows through the relatively small flow passages and the relatively large flow passage.

8. A method of controlling the flow of fluid through a conduit, comprising the steps of providing a ball valve in the conduit having a through bore formed therein for receiving the fluid, defining a plurality of relatively small flow passages and at least one relatively large flow passage in the conduit downstream of the ball valve, rotating the valve to direct the fluid from its bore through one or more of the flow passages, and providing an airfoil surface in the conduit downstream of the ball valve to prevent separation of the fluid as it passes through the relatively large flow passage.

9. The method of claim 8 wherein the fluid is directed through one or more of the relatively small flow passages or through the small flow passages and the large flow passage.

10. The method of claim 8 wherein the flow of fluid through the relatively small flow passages reduces the flow rate and the noise generated by the fluid flow, and the flow of fluid through the relatively large-diameter passage increases the flow rate.

11. The method of claim 8 further comprising the step of directing the fluid through some of the passages, into a cavity, and through other passages to achieve two-stage pressure reduction.

12. The method of claim 8 wherein, during the step of rotating, the valve directs the fluid through the relatively small flow passages before the relatively large flow passage.

13. The method of claim 8 wherein, in the fully open position of the valve, the fluid flows through the relatively small flow passages and the relatively large flow passage.

* * * * *